(12) United States Patent
Breuer

(10) Patent No.: US 10,728,764 B2
(45) Date of Patent: Jul. 28, 2020

(54) INTERLEAVED TRANSCEIVERS USING DIFFERENT RADIO SPECTRUM

(71) Applicant: AT&T Mobility II LLC, Atlanta, GA (US)

(72) Inventor: Kevin Breuer, Hubbardston, MA (US)

(73) Assignee: AT&T Mobility II LLC, Atlanta, GA (US)

(*) Notice: Subject to any disclaimer, the term of this patent is extended or adjusted under 35 U.S.C. 154(b) by 0 days.

(21) Appl. No.: 16/203,849

(22) Filed: Nov. 29, 2018

(65) Prior Publication Data

US 2019/0098509 A1 Mar. 28, 2019

Related U.S. Application Data

(63) Continuation of application No. 16/034,543, filed on Jul. 13, 2018, now Pat. No. 10,178,558, which is a continuation of application No. 15/209,976, filed on Jul. 14, 2016, now Pat. No. 10,057,780.

(51) Int. Cl.
| | |
|---|---|
| *H04W 16/14* | (2009.01) |
| *H04W 16/28* | (2009.01) |
| *H04B 7/04* | (2017.01) |
| *H04B 7/0491* | (2017.01) |
| *H04W 88/08* | (2009.01) |

(52) U.S. Cl.
CPC ............ *H04W 16/14* (2013.01); *H04B 7/04* (2013.01); *H04B 7/0491* (2013.01); *H04W 16/28* (2013.01); *H04W 88/08* (2013.01)

(58) Field of Classification Search
None
See application file for complete search history.

(56) References Cited

U.S. PATENT DOCUMENTS

| | | |
|---|---|---|
| 5,960,349 A | 9/1999 | Chheda et al. |
| 6,002,935 A | 12/1999 | Wang |
| 6,088,003 A | 7/2000 | Bassirat |
| 6,393,302 B1 | 5/2002 | O'Byrne |
| 6,580,912 B2 | 6/2003 | Leung et al. |
| 6,714,525 B1 | 3/2004 | Mansour |
| 6,745,051 B1* | 6/2004 | Bassirat ............... H01Q 1/1242 455/269 |
| 8,594,732 B2 | 11/2013 | Laroia et al. |
| 8,744,014 B2 | 6/2014 | Yeh et al. |
| 8,754,824 B2 | 6/2014 | Puente et al. |

(Continued)

OTHER PUBLICATIONS

U.S. Appl. No. 15/209,976, filed Jul. 14, 2016.
(Continued)

*Primary Examiner* — Frantz Bataille
(74) *Attorney, Agent, or Firm* — Amin, Turocy & Watson, LLP

(57) ABSTRACT

A cell site can be configured to have a first group of antennas arranged to provide coverage around the cell site and a second group of interleaved antennas that are interleaved between the antennas of the first group. The two groups can communicate at different frequency sets so that the two groups do not interfere with one another. Service nulls of one group that would otherwise be created by interference and low RSSI between antennas from the same group can be covered by the main beam of the other group, which can significantly improve SINR.

20 Claims, 10 Drawing Sheets

(56) References Cited

U.S. PATENT DOCUMENTS

| | | | |
|---|---|---|---|
| 2006/0262767 A1* | 11/2006 | Peleg | H04W 16/28 370/338 |
| 2014/0118196 A1 | 5/2014 | Koskiniemi | |
| 2015/0111614 A1 | 4/2015 | Vannithamby et al. | |
| 2015/0078218 A1 | 5/2015 | Karabinis | |
| 2016/0119857 A1* | 4/2016 | Mohan | H04W 72/0453 455/434 |
| 2017/0117950 A1* | 4/2017 | Strong | H04B 7/0452 |
| 2017/0311177 A1 | 10/2017 | Sarkissian | |

OTHER PUBLICATIONS

U.S. Appl. No. 16/034,543, filed Jul. 13, 2018.
Non-Final Office Action received for U.S. Appl. No. 15/209,976 dated May 30, 2017, 47 pages.
Final Office Action received for U.S. Appl. No. 15/209,976 dated Dec. 26, 2017, 54 pages.

* cited by examiner

INTERLEAVED TRANSCEIVERS USING DIFFERENT RADIO SPECTRUM

RELATED APPLICATION

The subject patent application is a continuation of, and claims priority to each of, U.S. patent application Ser. No. 16/034,543, filed Jul. 13, 2018, and entitled "INTERLEAVED TRANSCEIVERS USING DIFFERENT RADIO SPECTRUM," which is a continuation of U.S. patent application Ser. No. 15/209,976 (now U.S. Pat. No. 10,057,780), filed Jul. 14, 2016, and entitled "INTERLEAVED TRANSCEIVERS USING DIFFERENT RADIO SPECTRUM," the entireties of which applications are hereby incorporated by reference herein.

TECHNICAL FIELD

The present application relates generally to the field of mobile communication and more specifically to configuring an access point device to utilize different spectrum blocks for a first group of antennas/transceivers than for a second group of antennas/transceivers that are interleaved between the antennas/transceivers of the first group.

BACKGROUND

Radio spectrum refers to a wide range of radio frequencies. Different frequencies have different natural properties. In networks today, such as mobile communication networks, frequency ranges between about 700 MHz to about 2.5 GHz are deemed optimal for cellular communication based on a balance between natural properties noted above. Radios (e.g., antennas and/or transceivers) that communicate at different frequency ranges typically do not interfere with one another. Hence, much of the spectrum used in today's markets are allocated by ranges or blocks to different providers, typically either by license or auction. Thus, multiple service providers can provide services to customers in the same area by utilizing different frequency ranges. However, individual service providers are generally limited only to the portions of spectrum to which that service provider has been allocated or otherwise authorized to use.

BRIEF DESCRIPTION OF THE DRAWINGS

Numerous aspects, embodiments, objects and advantages of the present invention will be apparent upon consideration of the following detailed description, taken in conjunction with the accompanying drawings, in which like reference characters refer to like parts throughout, and in which.

DETAILED DESCRIPTION

Overview

Figure 1:
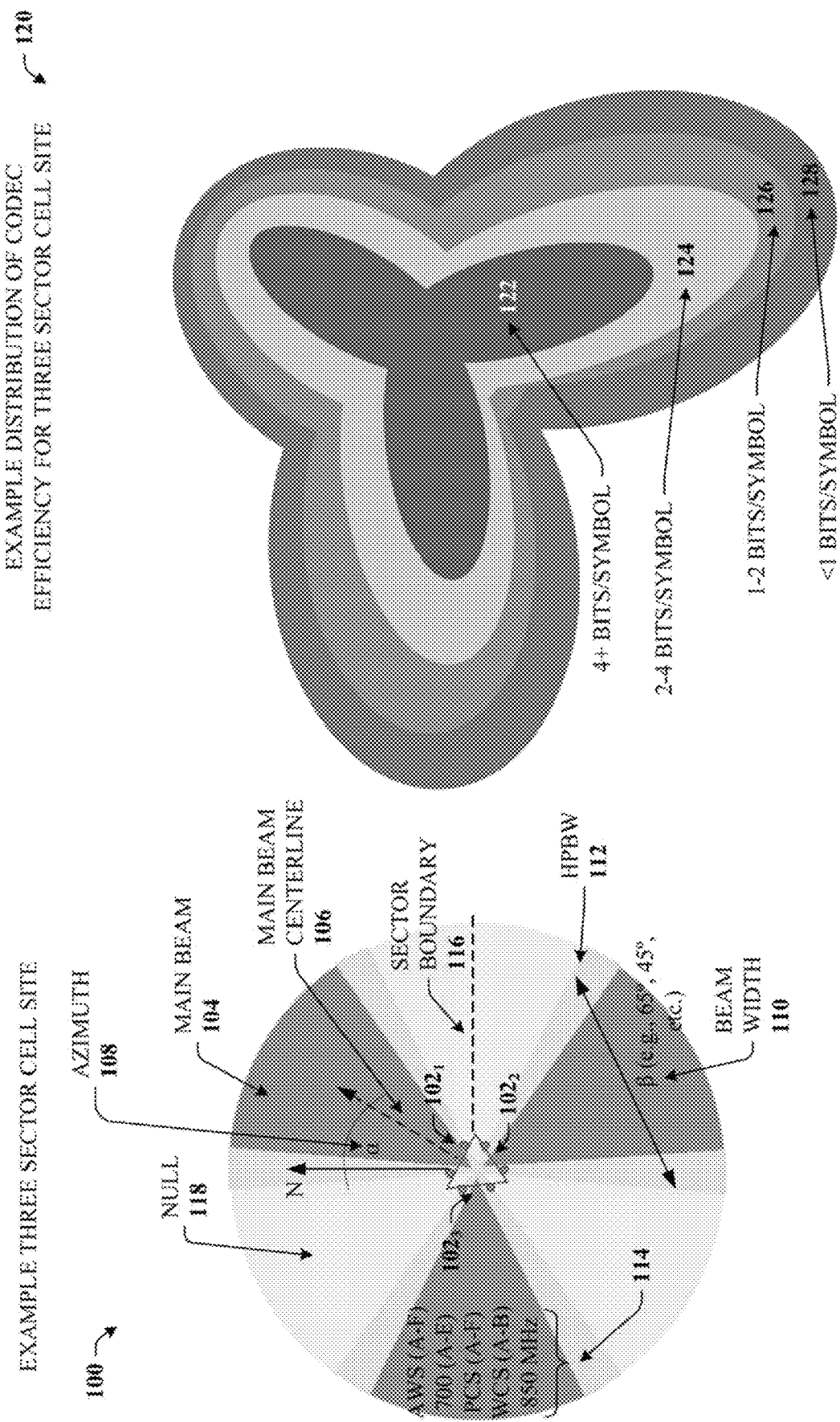
FIG. 1A illustrates a diagram of an example graphical illustration that illustrates a top-down view of various elements relating to an example three-sector cell site in accordance with certain embodiments of this disclosure.
FIG. 1B depicts an example graphical illustration that illustrates a view of an example distribution of codec efficiency for an example three-sector cell site in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

Mobile network providers in North America and certain other areas generally configure cell sites (e.g., comprising an eNodeB or other access point device) as three sector sites. In other words, the cell site will typically have three transceivers (also referred to herein as antennas or radios), each mapped to a different sector that together provide 360 degree coverage around the cell site. A common configuration is to use three 65 degree beam-width antennas, with azimuth's spaced approximately 120 degrees apart.

An example of such a configuration is provided with reference to FIG. 1A that depicts graphical illustration 100. Graphical illustration 100 illustrates a top-down view of various elements relating to an example three-sector cell site. The cell site comprises antennas $102_1$-$102_3$, which are referred to herein either individually or collectively as antenna(s) 102, with appropriate subscripts generally employed only when instructive or convenient to highlight various distinctions or to better impart the disclosed concepts. In this example, each antenna 102 has a main beam 104. A main beam centerline 106 that represents an approximate center of main beam 104 can be used to describe azimuth 108 representing an angle between main beam centerline 106 and a reference direction (in this case the North direction). In this example, antenna $102_1$ has an azimuth 108 of α=30 degrees. Azimuths 108 for antennas $102_2$ and $102_3$ generally differ by about 110-130 degrees in common configurations, and are here depicted as approximately α=150 degrees and α=270 degrees, respectively.

Antennas 102 will also have a beam width 110, which is generally considered the area of main beam 104 at which the signal is at least half the energy or power (e.g., the 3 dB point) as that seen at main beam centerline 106. As noted, a common configuration is to use three 65 degree beam-width antennas, and in that case, the beam width 110 of a given antenna 102 can be about β=65 degrees. Other beam widths 110 and number of antennas 102 are possible as well depending on design. The edges of main beam 104 are sometimes referred to as half power beam width (HPBW) 112 (e.g., the 3 dB point).

Cell sites are typically configured to transmit and receive information only at frequencies that an associated mobile service provider is authorized to utilize for services (e.g., by the FCC or another government agency or regulatory body), which are typically allocated in large blocks or ranges referred to herein as bands. A non-exhaustive list of available bands is indicated at reference numeral 114. Most bands are subdivided into smaller blocks of frequencies that are typically labeled alphabetically. For example, the 700 MHz band has five blocks labeled A-E and each block is generally divided into two or more non-contiguous sub-blocks, one or more for uplink traffic and one or more for downlink traffic. For instance, the 700A block comprises an uplink portion (e.g., traffic from user equipment (UE) to access point) that designated as a frequency range from 698 MHz to 704 MHz, whereas the downlink portion (e.g., traffic from the access point to the UE) is designated as a frequency range from 728 MHz to 734 MHz. Hence, uplink traffic and downlink traffic for a given band generally do not interfere with each other.

On the other hand, traffic from one antenna (e.g., $102_1$) generally does interfere with traffic from another antenna (e.g., $102_2$) because all antennas 102 at a cell site typically use the same frequencies so that all sectors have access to all available bands. Such interference typically does not affect communication within main beam 104 and/or beam width 110. However, such interference can be particularly problematic at boundaries 116 between sectors, where the signal strengths of adjacent sector antennas 102 are approximately the same and interfering with one another. Such areas are referred to herein as nulls 118.

UE devices that are geographically located within a null 118 will typically experience non-optimal service. For example, a signal-to-interference-plus-noise ratio (SINR) and received signal strength indicator (RSSI) in a null 118 are much lower than when located within main beam 104. Poor SINR can result in numerous issues. For instance, data integrity can be compromised leading to re-transmission requests, which can tax UE battery life and negatively impact user experiences. In some cases, communication sessions can stall or be lost. In areas with low SINR, service providers typically compensate by using lower order codecs for such traffic, which is further described with reference to FIG. 1B.

Turning now to FIG. 1B, graphical illustration 120 is depicted. Graphical illustration 120 illustrates a view of an example distribution of codec efficiency for an example three-sector cell site. In this example, the coverage area of a three sector cell site is divided into four regions, labeled here as 122, 124, 126, and 128. As can be seen, regions along the main beams (e.g., main beams 104), which have a very high SINR, can use high efficiency codecs, e.g., four or more bits of data per encoding symbol. In these areas, throughput is typically very good and the use of physical resource blocks (PRBs) is efficient since most of the traffic is the data payload rather than codec symbols due to the high codec efficiency selection. Since SINR tends to be poor in nulls (e.g., null 118) and gets worse as one approaches sector boundaries (e.g., sector boundary 116), such is compensated for by using low efficiency codecs. Such results in allocating more PRBs to carry traffic at slower rates. Throughput and capacity decrease across the sector as more PRBs are needed to serve traffic in the nulls, leaving less available traffic carrying PRBs for areas in the sector that have high SINR and where more efficient codecs are typically deployed.

The disclosed interleave techniques for long term evolution (LTE) and other suitable deployments seek to address several inherent issues within current LTE or other radio systems. These issues relate to the efficiency of PRBs and codec schemes beyond the 3 dB horizontal antenna beamwidth (e.g., HPBW 112) of a macro antenna site. Beyond this 3 dB point (e.g., in nulls 118), spectrum and PRBs are used inefficiently due to decreases in SINR. The disclosed interleave techniques address these inefficiencies by creating new sectors through the deployment of an additional antenna. These new antennas can be offset by 60 degrees to that of the current traditional sectors, creating a 6-sector site, or alternatively an existing secondary antenna on each sector can be re-orientated to create the new interleaved sectors. However, unique to this solution versus traditional sector configurations is, the new antennas will transmit a different frequency set than the current sectors, creating gains in throughput and capacity via codec efficiency rather than through use of additional spectrum. The disclosed techniques can increase capacity, throughput, and coverage and can reduce power consumption both at the access point device and at the UE.

Example Interleaved Systems

Figure 2:
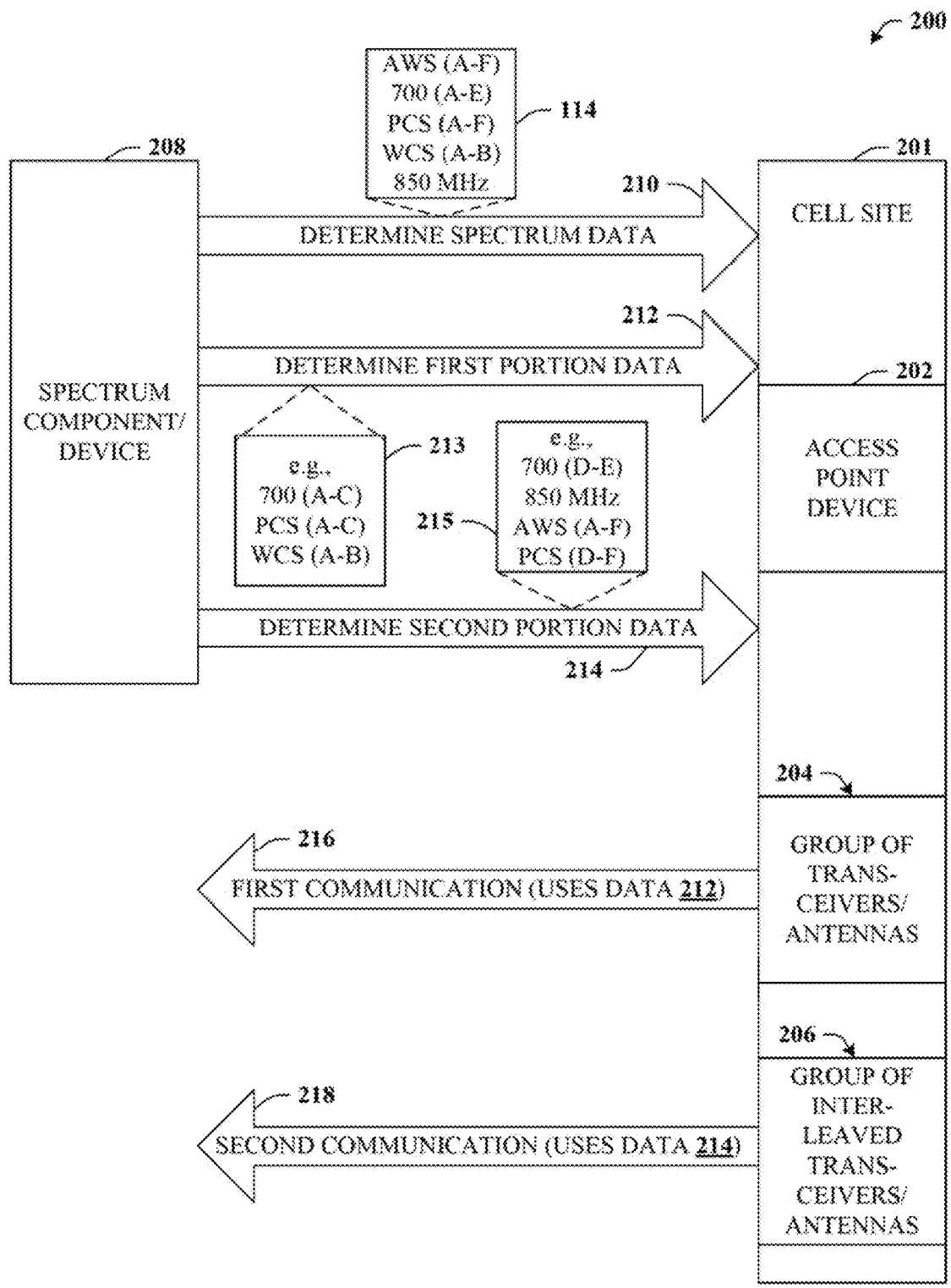
FIG. 2 depicts an example system that can provide for interleaving transceivers with other transceivers that operate at different frequency ranges in accordance with certain embodiments of this disclosure.

With reference now to FIG. 2, system 200 is depicted. System 200 can provide for interleaving transceivers with other transceivers that operate at different frequency ranges. For example, system 200 can comprise a cell site 201 that can be or can include access point device 202. The cell site 201 can comprise a first group of transceivers/antennas (e.g., group 204) and a second group of transceivers/antennas (e.g., interleaved group 206). In some embodiments, group 204 can be substantially similar to transceivers/antenna $102_1$-$102_3$ described in connection with FIG. 1A. Group 204 can comprise three transceivers, but a different number of transceivers is possible. Interleaved group 206 can comprise a like number (e.g., three or another number) of different transceivers that are interleaved between the transceivers of group 204.

A spectrum device 208 can determine spectrum data 210 that is indicative of frequency ranges cell site 201 utilizes for communication. Spectrum data 210 can represent an entirety of frequency ranges cell site 201 uses, is configured to use, and/or is authorized to use for over-the-air communication. Spectrum data 210 can comprise and/or be representative of various carrier bands, which can be licensed, owned, or otherwise authorized for use. A non-exhaustive list of example carrier bands (and associated frequency ranges) is provided at reference numeral 114. Hence, list 114 can be a representative example of spectrum data 210 that a cell site 201 is authorized to use. Other examples of spectrum data 210 can exist, and will generally be to some extent service provider-specific. For example, some service providers may not use any of the carrier band frequencies given in list 114, but will use other carrier band frequencies instead. However, it is understood that the disclosed subject matter can be nonetheless applicable in such cases.

In some embodiments, spectrum device 208 can be remote from cell site 201. For example, spectrum device 208 can be in a core portion of a communication network. In some embodiments, cell site 201 and/or access point device 202 can comprise spectrum device 208. Spectrum device 208 can further determine first portion data 212 that can be indicative of a first portion of the frequency ranges. Spectrum device 210 can determine second portion data 214 indicative of a second portion of the frequency ranges that does not overlap the first portion.

In some embodiments, first portion data 212 can comprise or represent a first carrier band and the second portion data 214 can comprise or represent a second carrier band that is not the first carrier band. Lists 213 and 215 provide representative examples that essentially divvy up the available carrier bands, or certain blocks of a carrier band, between first portion data 212 and second portion data 214. Thus, first portion data 212 and second portion data 214 can describe numerous frequency ranges that do not overlap. In some embodiments, first portion data 212 and second portion data 214 can both represent approximately half of the frequency ranges represented by spectrum data 210.

Cell site 201 and/or access point device 202 can facilitate first communication 216 via transceivers (e.g., group 204) that utilize the first portion of the frequency ranges (e.g., described by first portion data 212). A first transceiver of the transceivers has a first azimuth that is not a second azimuth of a second transceiver of the transceivers. Cell site 201 and/or access point device 202 can facilitate second communication 218 via interleaved transceivers (e.g., interleaved group 206) that utilize the second portion of the frequency ranges (e.g., described by second portion data 214). A first interleaved transceiver of the interleaved transceivers has an interleaved azimuth approximately midway between the first azimuth and the second azimuth.

In other words, transceivers of group 204 respectively cover unique sectors, typically a full 360 degrees around cell site 201. Because nulls will occur at sector boundaries (e.g., due to interference with neighboring transceivers of group 204), the main beams of interleaved transceivers of interleaved group 206 can effectively cover those nulls. Similarly, an interleaved transceiver may interfere with another interleaved transceiver of interleaved group 206, but the nulls thereby created will be at the main beam region of the transceivers of group 204. The transceivers of group 204 and the interleaved transceivers of group 206 do not interfere with one another since communication for each is at different frequency ranges and/or different carrier bands or carrier band blocks. These and other elements are further detailed in connection with FIG. 3.

Figure 3:
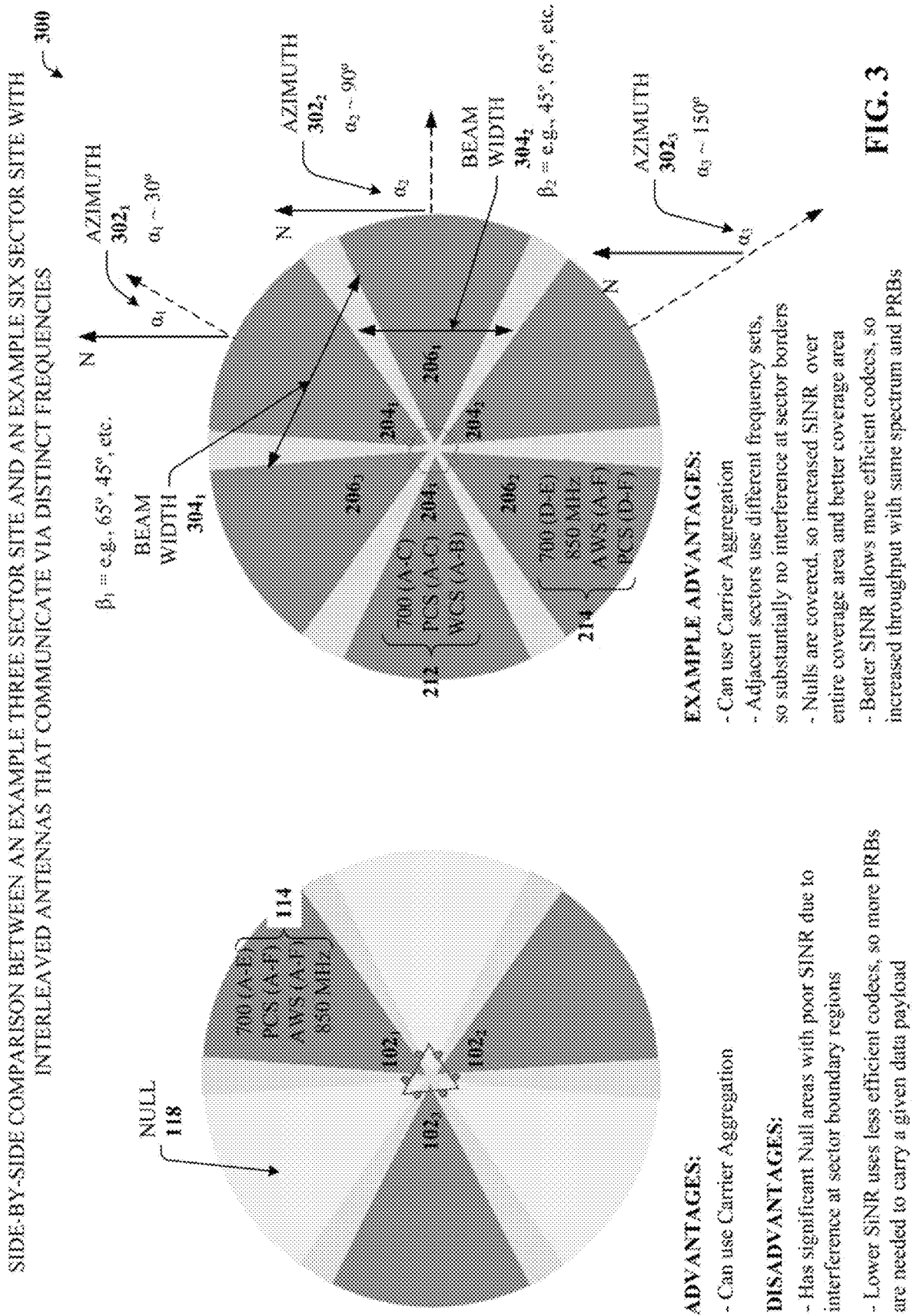
FIG. 3 illustrates an example graphical illustration that depicts a side-by-side comparison between an example three sector site and an example six sector site with interleaved antennas that communicate via distinct frequencies in accordance with certain embodiments of this disclosure.

Turning now to FIG. 3, graphical illustration 300 is provided. Graphical illustration 300 depicts a side-by-side comparison between an example three sector site and an example six sector site with interleaved antennas that communicate via distinct frequencies. In previous systems, which are exemplified at the left portion of FIG. 3, all available frequencies and/or carrier bands (e.g., 114) a cell site is configured to use are stacked at the same azimuths (e.g., 30 degrees, 150 degrees, and 270 degrees). Such provides a significant advantage in LTE and other deployments in the form of carrier aggregation (CA). In short, CA allows for using multiple carrier bands together in what is essentially an aggregated larger carrier that can provide higher throughput. For example, consider a UE that is configured to communicate at the 700 MHz carrier band and at the broadband personal communications service (PCS) carrier band (e.g., 1900 MHz). Instead of using one or the other, the UE can communicate with an access point device over both, effectively gaining access to more frequencies for data traffic.

However, previous systems also have certain disadvantages such as having significant null areas 118 with poor SINR and RSSI due to interference at sector boundary regions. The poor SINR requires less efficient codecs, so more PRBs are needed to carry a given data payload. It should be understood that merely adding additional antennas does not remedy many of the issues noted above. More antennas will provide more main beams where SINR is typically good, but will also create more nulls 118 where SINR is poor, since each antenna will interfere with co-site neighbors at frequencies that both antennas use.

The right portion of FIG. 3 shows an example of the disclosed interleaved technique. It should be understood that the benefits detailed herein are not necessarily a function of doubling the number of antennas, but rather are a function of the concept of using distinct frequencies for interleaved antennas so that interference with co-site neighbors is mitigated.

In this example, three transceivers $204_1$-$204_3$ of group 204 are depicted and deployed at azimuths that differ by about 120 degrees. For example, azimuth $302_1$ (e.g., 30 degrees) differs from azimuth $302_3$ (e.g., 150 degrees) by about 120 degrees. Three interleaved transceivers $206_1$-$206_3$ of interleaved group 206 are also depicted with azimuths that are approximately midway between the azimuths of adjacent transceivers 204. For example, azimuth $302_2$ (e.g., 90 degrees) is midway between azimuths $302_1$ and $302_3$.

Beam width $304_1$ associated with one or more transceivers 204 can be any suitable width (e.g., 65 degrees, 45 degrees, etc.) and can be the same for all transceivers 204 or different for some transceivers 204. Beam width $304_2$ associated with one or more interleaved transceivers 206 can be any suitable width (e.g., 45 degrees, 65 degrees, etc.) and can be the same for all interleaved transceivers 206 or different for some interleaved transceivers 206. An example configuration can be transceivers 204 having beam width $304_1$=65 degrees (similar to existing configurations to minimize costs by reusing equipment already located at cell sites) and interleaved transceivers 206 having beam width $304_2$=45 degrees to effectively cover nulls. Another example configuration is beam widths $304_1$ and $304_2$ both being about 45 degrees.

As noted, all transceivers 204 can utilize frequency ranges associated with first portion data 212, whereas all interleaved transceivers 206 can utilize frequency ranges associated with second portion data 214. Accordingly, communication via any of transceivers 204 will not substantially interfere with communication via any of interleaved transceivers 206.

Since multiple carrier bands can be utilized for either or both transceivers 204 and interleaved transceivers 206, CA can be possible for the interleaved techniques disclosed herein. In some embodiments, the maximum throughput for the previous (non-interleaved) systems under ideal conditions may be greater than what can be attained by an interleaved embodiment. However, much of the coverage area, at most daily periods, is not in fact ideal conditions in previous systems. In this regard, the significant improvements to SINR (and RSSI) over the entire coverage area can provide a significant increase in throughput for cell site 201 as a whole. Such can improve customer experiences (e.g., better connections, fewer timeouts, better average throughput, etc.) and improve UE battery life (e.g., fewer retries, etc.)

Moreover, because SINR is improved, more efficient codecs can be used for transmission of data. As a result, throughput can be increased without increasing spectrum or PRBs. In this regard, model-based testing indicates that total cell efficiency for radio link control (RLC) throughput can be improved by about by about 52%, as shown Table I below. Baseline throughput is based on a standard configuration (e.g., see left portion of FIG. 3) of three 65-degree beam width antenna. Interleaved throughput is based on a three 65-degree beam width antennas (e.g., group 204) interleaved with three 45-degree beam width antenna (e.g., group 206). Configurations with all six antennas having 45-degree beam width show even greater improvement.

TABLE I

| Baseline | 1186.9 Mbps |
| Interleaved (65_45) | 1803.3 Mbps |
| % Improvement | 51.94% |

Table II below illustrates predicted improvements for three different interleaved configurations (bottom three rows) versus the baseline (top row) and a second baseline comprising bi-sector antennas (BSA) (e.g., three split-beam antennas and/or duo-sector antennas). Table II illustrates a percentage of traffic served by SINR range. As can be seen, about 90% more traffic is served (e.g., relative to the baseline) by the interleaved configurations for SINR values between 10-20 dB.

TABLE II

|  | QPSK (<1.2 bits/symbol) SINR < 5 dB | QPSK (1.4-2.2 bits/symb.) SINR 5-10 dB | 16 QAM SINR 10-20 dB | 64 QAM SINR > 20 dB |
|---|---|---|---|---|
| Baseline | 73.8 | 14.0 | 11.5 | 0.7 |
| BSA (3 split sectors) | 80.4 | 14.3 | 5.3 | 0 |
| Interleaved (6 × 65deg) | 59.7 | 19.7 | 20.1 | 0.5 |
| Interleaved (65_45) | 57.3 | 19.9 | 21.8 | 1.1 |
| Interleaved (6 × 45deg) | 55.1 | 19.1 | 22.3 | 3.4 |

TABLE III

|  | PRBs | Total Cell TP (Mbps) | increase over baseline | Efficiency (Kbps/ PRBs) | 2- carrier CA TP (Mbps) | 3- carrier CA TP (Mbps) |
|---|---|---|---|---|---|---|
| Baseline | 150 | 1186.9 | — | 95.2 | 2373.8 | 3560.7 |
| BSA | 300 | 1945.8 | 64% | 77.4 | 3891.6 | 5837.4 |
| Interleaved (6 × 65deg) | 150 | 1660.9 | 40% | 132.1 | 3321.8 | 4982.7 |
| Interleaved (65_45) | 150 | 1803.3 | 52% | 142.9 | 3606.6 | 5409.9 |
| Interleaved (6 × 45deg) | 150 | 197301 | 66% | 157.1 | 3946.2 | 5919.3 |

Table III above, illustrates comparisons of various interleaved configurations versus the baseline configuration and the BSA configuration. Aggregate throughput (TP) gains over the baseline configuration are observed in each scenario. While BSA gains were also achieved, it is noted BSA used twice as many physical resource blocks. Thus, BSA has the lowest efficiency (e.g., Kbps/PRBs) metric. Unlike BSA, interleaved configurations have significant gains in both throughput and efficiency, and such gains are achieved through spectral efficiency (e.g., no additional PRBs added) that result from better SINR. Furthermore, the interleaved configurations show throughput ratings of 2-carrier CA that are comparable or superior to 3-carrier CA of the baseline.

Figure 4:
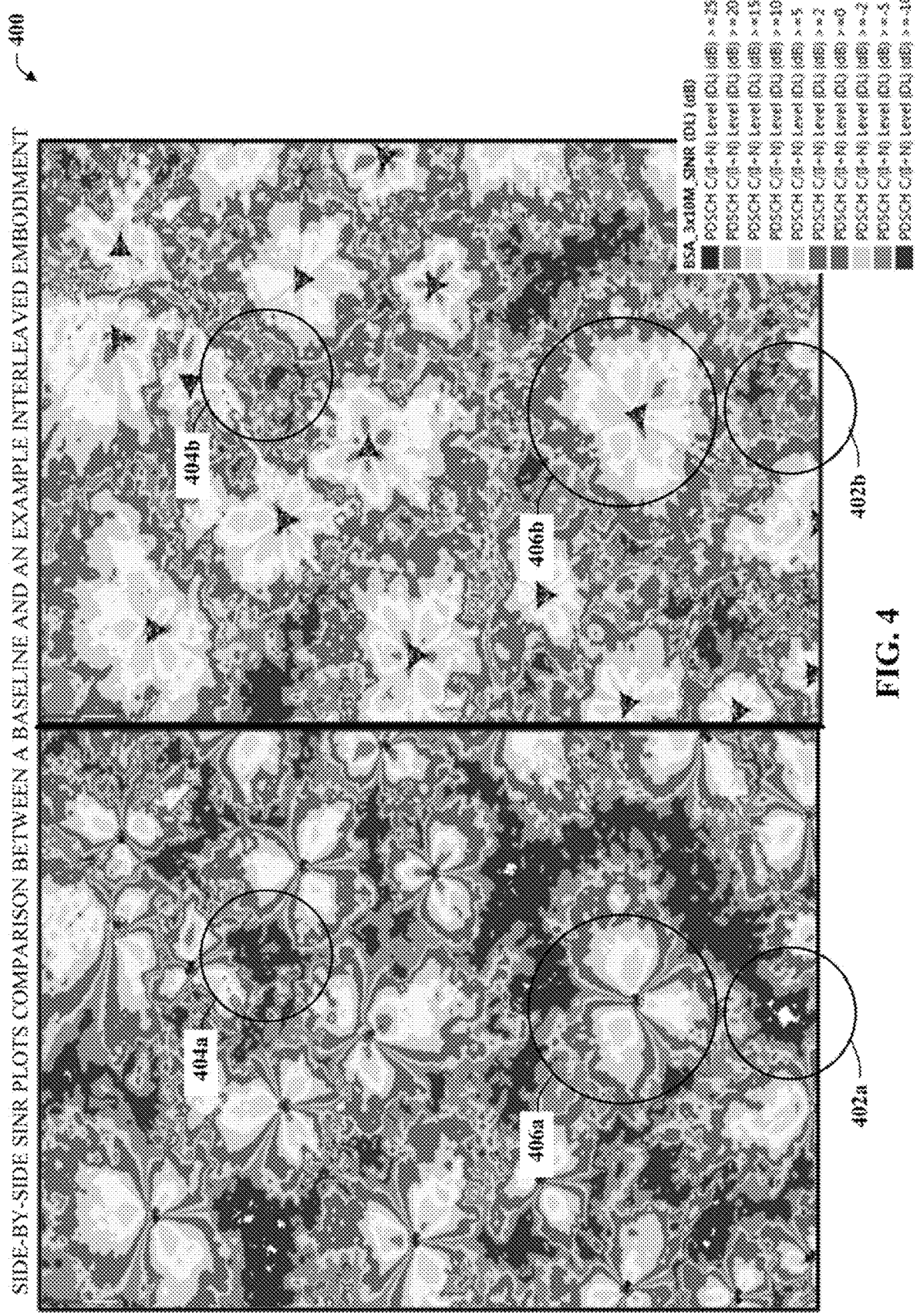
FIG. 4 depicts an example graphical illustration that provides side-by-side SINR plots comparison between a baseline and an example interleaved embodiment in accordance with certain embodiments of this disclosure.

Turning now to FIG. 4, graphical illustration 400 is depicted. Graphical illustration 400 provides side-by-side SINR plots comparison between a baseline and an example interleaved embodiment. Circle 402a of the baseline SINR plot on the left portion of FIG. 4 illustrates white areas indicating an SINR<−10 dB where service is likely unavailable. Circle 402b of the interleaved example on the right side of FIG. 4 illustrates virtually all such areas have been eliminated. Areas that are less than −5 dB can be eliminated or mitigated as illustrated by circle 404a to circle 404b. Circles 406a and 406b illustrate that nearly 360 degrees around cell sites (e.g., cell site 201) can be improved by interleaved examples to have SINR values greater than 10 dB.

Figure 5:
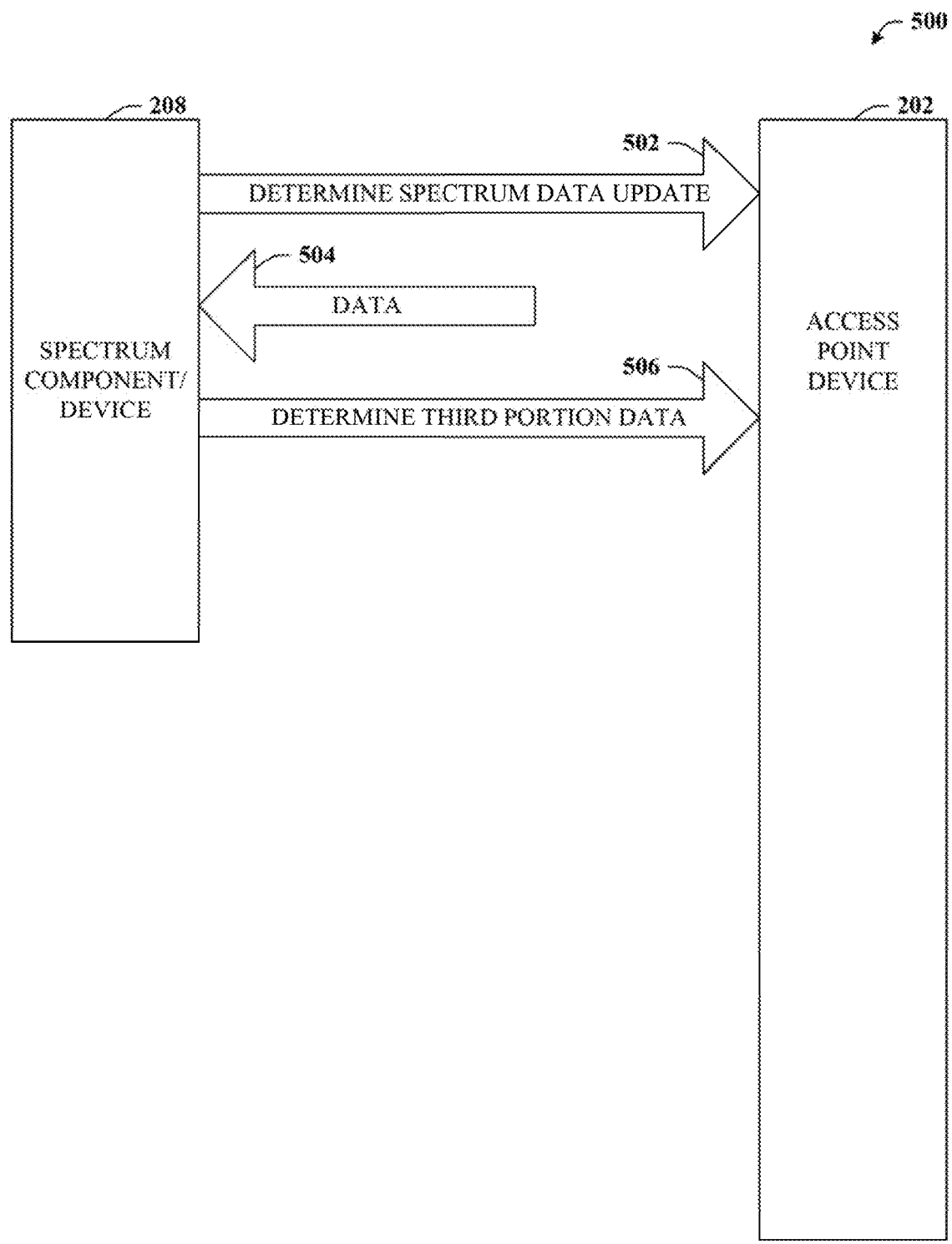
FIG. 5 illustrates a block diagram of an example system that can provide for additional elements or aspects in connection with interleaving separate frequency transceivers with other transceivers in accordance with certain embodiments of this disclosure.

With reference now to FIG. 5, system 500 is depicted. System 500 can provide for additional elements or aspects in connection with interleaving separate frequency transceivers with other transceivers. For example, in some embodiments, spectrum device 208 can determine an update 502 to spectrum data 210. Update 502 can result in an update to one or both first portion data 212 and second portion data 214. As one example, certain frequencies or one or more carrier bands can be swapped between first portion data 212 and second portion data 214, so transceivers of group 204 and interleaved group 206 communicate according to the update 502 (e.g., using updated frequencies or carrier band(s)). Certain current and next generation transceivers/antenna can enable such updates 502 on a sub-second basis.

In some embodiments, update 502 can be based on data 504 received by spectrum device 208. For example, data 504 can comprise various load metrics, use profiles, other performance indicators, or forecasted metrics, profiles, or indicators.

In some embodiments, spectrum device 208 can determine third portion data 506 indicative of a third portion of the frequency ranges (e.g., spectrum data 210) comprising a portion of the second portion (e.g., second portion data 214). In other words, spectrum data 210 can be separated into three rather than two distinct portions, which can be useful in certain scenarios. In some embodiments, second communication 218 can comprise communication via one or more of the interleaved transceivers of interleaved group 206 that utilizes the third portion of the frequency ranges. In some embodiments, update 502 can comprise updating the third portion data 506. Such can be based on data 504 as well.

Example Methods

Figure 6:
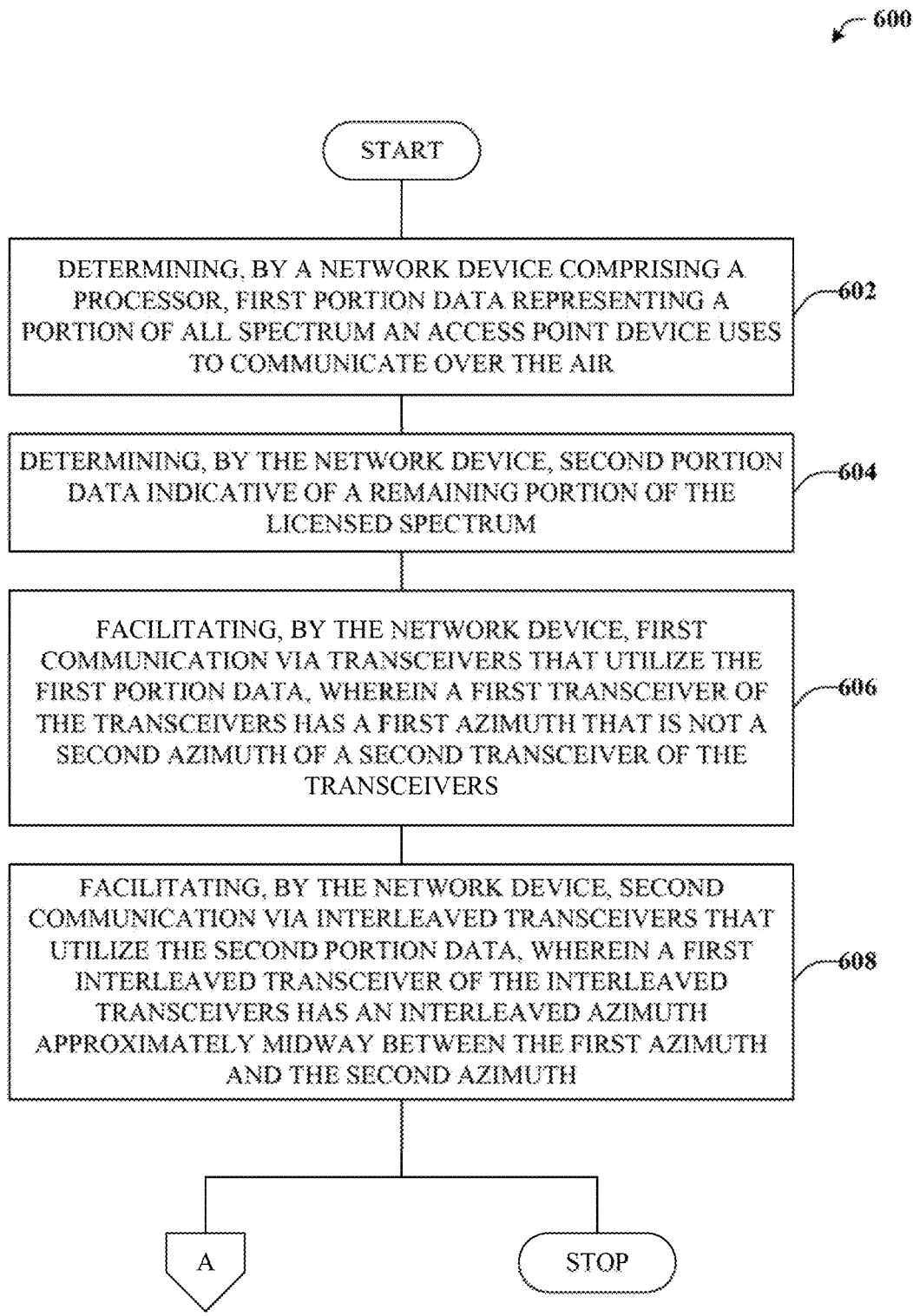
FIG. 6 illustrates an example methodology that can provide for interleaving transceivers with other transceivers that operate at different frequency ranges in accordance with certain embodiments of this disclosure.
Figure 7:
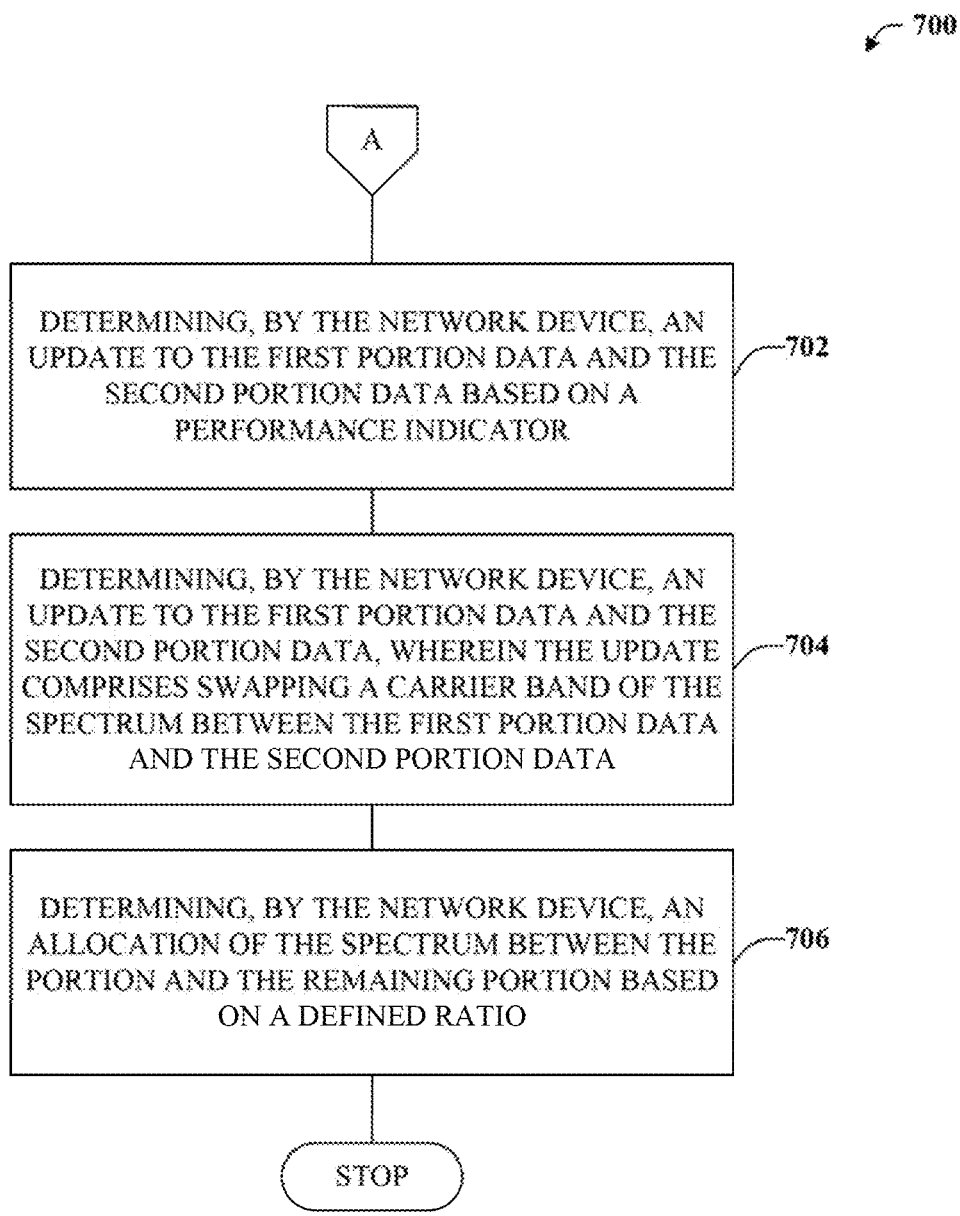
FIG. 7 illustrates an example methodology that can provide for additional elements or aspects in connection with interleaving transceivers with other transceivers that operate at different frequency ranges in accordance with certain embodiments of this disclosure.

FIGS. 6 and 7 illustrate various methodologies in accordance with the disclosed subject matter. While, for purposes of simplicity of explanation, the methodologies are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the disclosed subject matter. Additionally, it should be further appreciated that the methodologies disclosed hereinafter and throughout this specification are capable of being stored on an article of manufacture to facilitate transporting and transferring such methodologies to computers.

Turning now to FIG. 6, exemplary method 600 is depicted. Method 600 can provide for interleaving transceivers with other transceivers that operate at different frequency ranges. For example, at reference numeral 602, a network device comprising a processor can determine first portion data representing a portion of all spectrum an access point device uses to communicate over the air. The spectrum can be licensed spectrum or other spectrum an operator is authorized to use for over the air communication.

At reference numeral 604, the network device second portion data indicative of a remaining portion of the spectrum. For example, the first portion data and the second portion data can include frequencies and/or carrier band blocks that do not overlap. In some embodiments, the first portion data and the second portion data can represent about half of the total spectrum.

At reference numeral 606, the network device can facilitate first communication via transceivers that utilize the first portion data. A first transceiver of the transceivers can have a first azimuth that is not a second azimuth of a second transceiver of the transceivers. In other words, the transceivers can be arranged at different angles, e.g., to cover 360 degrees around a cell site. In some embodiments, a number of the transceivers can be three or more. In some embodiments, the first transceiver can be a 65 degree beam width transceiver or a 45 degree beam width transceiver.

At reference numeral 608, the network device can facilitate second communication via interleaved transceivers that utilize the second portion data, wherein a first interleaved transceiver of the interleaved transceivers has an interleaved azimuth approximately midway between the first azimuth and the second azimuth. In other words, the interleaved transceivers can be arranged to have a main beam that overlaps null areas of the transceivers. As one result, SINR, RSSI, and/or coverage area can be increased. In some embodiments, a number of the interleaved transceivers can be equal to the number of transceivers (e.g., three or more). In some embodiments, the first interleaved transceiver can be a 45 degree beam width transceiver or a 65 degree beam width transceiver. Method 600 can proceed to insert A, which is further detailed in connection with FIG. 7, or stop.

With reference now to FIG. 7, exemplary method 700 is illustrated. Method 700 can provide for additional elements or aspects in connection with interleaving transceivers with other transceivers that operate at different frequency ranges. For example, at reference numeral 702, the network device can determine an update to the first portion data and the second portion data based on a performance indicator. For example, frequencies and/or carrier band blocks can be moved from the first portion data (utilized by the transceivers) to the second portion data (utilized by the interleaved transceivers) or vice versa.

At reference numeral 704, the network device can determine an update to the first portion data and the second portion data, wherein the update comprises swapping a carrier band of the spectrum between the first portion data and the second portion data. In some embodiments, determination can be based on the performance indicator.

At reference numeral 706, the network device can determine an allocation of the spectrum between the portion and the remaining portion based on a defined ratio. In some embodiments, the defined ratio can be determined based on the performance ratio. In some embodiments, the defined ratio can be updated or selected based on characteristics of a given cell site.

Example Operating Environments

Figure 8:
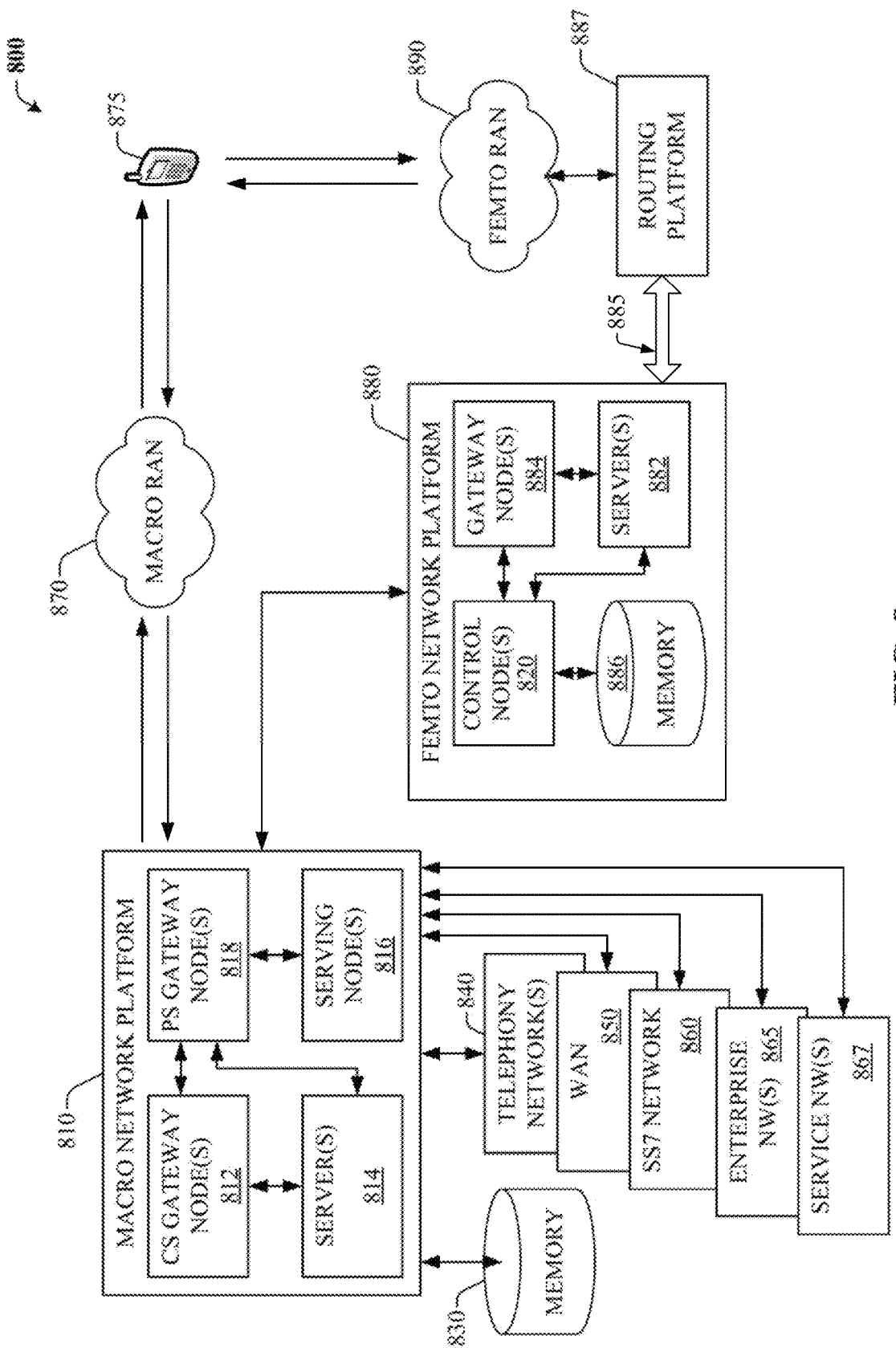
FIG. 8 illustrates a first example of a wireless communications environment with associated components that can be operable to execute certain embodiments of this disclosure.

To provide further context for various aspects of the subject specification, FIG. 8 illustrates an example wireless communication environment 800, with associated components that can enable operation of a femtocell enterprise network in accordance with aspects described herein. Wireless communication environment 800 comprises two wireless network platforms: (i) A macro network platform 810 that serves, or facilitates communication with user equipment 875 via a macro radio access network (RAN) 870. It should be appreciated that in cellular wireless technologies (e.g., 4G, 3GPP UMTS, HSPA, 3GPP LTE, 3GPP UMB, 5G), macro network platform 810 is embodied in a Core Network. (ii) A femto network platform 880, which can provide communication with UE 875 through a femto RAN 890, linked to the femto network platform 880 through a routing platform 887 via backhaul pipe(s) 885. It should be appreciated that femto network platform 880 typically offloads UE 875 from macro network, once UE 875 attaches (e.g., through macro-to-femto handover, or via a scan of channel resources in idle mode) to femto RAN.

It is noted that RAN comprises base station(s), or access point(s), and its associated electronic circuitry and deployment site(s), in addition to a wireless radio link operated in accordance with the base station(s). Accordingly, macro RAN 870 can comprise various coverage cells, while femto RAN 890 can comprise multiple femto access points or multiple metro cell access points. As mentioned above, it is to be appreciated that deployment density in femto RAN 890 can be substantially higher than in macro RAN 870.

Generally, both macro and femto network platforms 810 and 880 comprise components, e.g., nodes, gateways, interfaces, servers, or platforms, that facilitate both packet-switched (PS) (e.g., internet protocol (IP), Ethernet, frame relay, asynchronous transfer mode (ATM)) and circuit-switched (CS) traffic (e.g., voice and data) and control generation for networked wireless communication. In an aspect of the subject innovation, macro network platform 810 comprises CS gateway node(s) 812 which can interface CS traffic received from legacy networks like telephony network(s) 840 (e.g., public switched telephone network (PSTN), or public land mobile network (PLMN)) or a SS7 network 860. Circuit switched gateway 812 can authorize and authenticate traffic (e.g., voice) arising from such networks. Additionally, CS gateway 812 can access mobility, or roaming, data generated through SS7 network 860; for instance, mobility data stored in a VLR, which can reside in memory 830. Moreover, CS gateway node(s) 812 interfaces CS-based traffic and signaling and gateway node(s) 818. As an example, in a 3GPP UMTS network, gateway node(s) 818 can be embodied in gateway GPRS support node(s) (GGSN).

In addition to receiving and processing CS-switched traffic and signaling, gateway node(s) 818 can authorize and authenticate PS-based data sessions with served (e.g., through macro RAN) wireless devices. Data sessions can comprise traffic exchange with networks external to the macro network platform 810, like wide area network(s) (WANs) 850; it should be appreciated that local area network(s) (LANs) can also be interfaced with macro network platform 810 through gateway node(s) 818. Gateway node(s) 818 generates packet data contexts when a data session is established. To that end, in an aspect, gateway node(s) 818 can comprise a tunnel interface (e.g., tunnel termination gateway (TTG) in 3GPP UMTS network(s); not shown) which can facilitate packetized communication with disparate wireless network(s), such as Wi-Fi networks. It should be further appreciated that the packetized communication can comprise multiple flows that can be generated through server(s) 814. It is to be noted that in 3GPP UMTS network(s), gateway node(s) 818 (e.g., GGSN) and tunnel interface (e.g., TTG) comprise a packet data gateway (PDG).

Macro network platform 810 also comprises serving node(s) 816 that convey the various packetized flows of information or data streams, received through gateway node(s) 818. As an example, in a 3GPP UMTS network, serving node(s) can be embodied in serving GPRS support node(s) (SGSN).

As indicated above, server(s) 814 in macro network platform 810 can execute numerous applications (e.g., location services, online gaming, wireless banking, wireless device management . . . ) that generate multiple disparate packetized data streams or flows, and manage (e.g., schedule, queue, format . . . ) such flows. Such application(s), for example can comprise add-on features to standard services provided by macro network platform 810. Data streams can be conveyed to gateway node(s) 818 for authorization/authentication and initiation of a data session, and to serving node(s) 816 for communication thereafter. Server(s) 814 can also effect security (e.g., implement one or more firewalls) of macro network platform 810 to ensure network's operation and data integrity in addition to authorization and authentication procedures that CS gateway node(s) 812 and gateway node(s) 818 can enact. Moreover, server(s) 814 can provision services from external network(s), e.g., WAN 850, or Global Positioning System (GPS) network(s) (not shown). It is to be noted that server(s) 814 can comprise one or more processor configured to confer at least in part the functionality of macro network platform 810. To that end, the one or more processor can execute code instructions stored in memory 830, for example.

In example wireless environment 800, memory 830 stores information related to operation of macro network platform 810. Information can comprise business data associated with subscribers; market plans and strategies, e.g., promotional campaigns, business partnerships; operational data for mobile devices served through macro network platform; service and privacy policies; end-user service logs for law enforcement; and so forth. Memory 830 can also store information from at least one of telephony network(s) 840, WAN(s) 850, or SS7 network 860, enterprise NW(s) 865, or service NW(s) 867.

Femto gateway node(s) 884 have substantially the same functionality as PS gateway node(s) 818. Additionally, femto gateway node(s) 884 can also comprise substantially all functionality of serving node(s) 816. In an aspect, femto gateway node(s) 884 facilitates handover resolution, e.g., assessment and execution. Further, control node(s) 820 can receive handover requests and relay them to a handover component (not shown) via gateway node(s) 884. According to an aspect, control node(s) 820 can support RNC capabilities.

Server(s) 882 have substantially the same functionality as described in connection with server(s) 814. In an aspect, server(s) 882 can execute multiple application(s) that provide service (e.g., voice and data) to wireless devices served through femto RAN 890. Server(s) 882 can also provide security features to femto network platform. In addition, server(s) 882 can manage (e.g., schedule, queue, format . . . ) substantially all packetized flows (e.g., IP-based) it generates in addition to data received from macro network platform 810. It is to be noted that server(s) 882 can comprise one or more processor configured to confer at least in part the functionality of macro network platform 810. To that end, the one or more processor can execute code instructions stored in memory 886, for example.

Memory 886 can comprise information relevant to operation of the various components of femto network platform 880. For example operational information that can be stored in memory 886 can comprise, but is not limited to, subscriber information; contracted services; maintenance and service records; femto cell configuration (e.g., devices served through femto RAN 890; access control lists, or white lists); service policies and specifications; privacy policies; add-on features; and so forth.

It is noted that femto network platform 880 and macro network platform 810 can be functionally connected through one or more reference link(s) or reference interface(s). In addition, femto network platform 880 can be functionally coupled directly (not illustrated) to one or more of external network(s) 840, 850, 860, 865 or 867. Reference link(s) or interface(s) can functionally link at least one of gateway node(s) 884 or server(s) 886 to the one or more external networks 840, 850, 860, 865 or 867.

Figure 9:
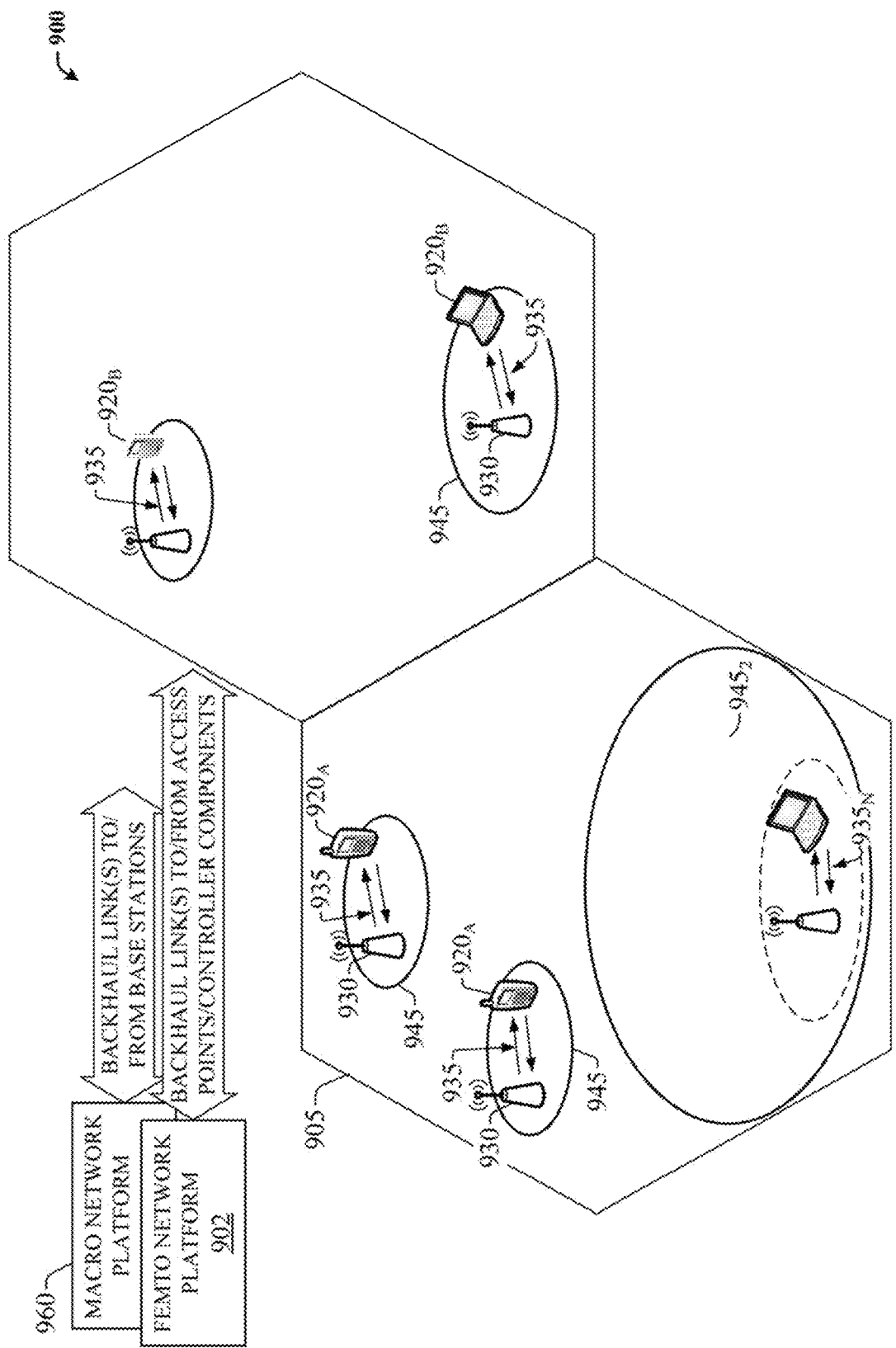
FIG. 9 illustrates a second example of a wireless communications environment with associated components that can be operable to execute certain embodiments of this disclosure.

FIG. 9 illustrates a wireless environment that comprises macro cells and femtocells for wireless coverage in accordance with aspects described herein. In wireless environment 905, two areas represent "macro" cell coverage; each macro cell is served by a base station 910. It can be appreciated that macro cell coverage area 905 and base station 910 can comprise functionality, as more fully described herein, for example, with regard to system 900. Macro coverage is generally intended to serve mobile wireless devices, like UE 920$_A$, 920$_B$, in outdoors locations. An over-the-air (OTA) wireless link 935 provides such coverage, the wireless link 935 comprises a downlink (DL) and an uplink (UL), and utilizes a predetermined band, licensed or unlicensed, of the radio frequency (RF) spectrum. As an example, UE 920$_A$, 920$_B$ can be a 3GPP Universal Mobile Telecommunication System (UMTS) mobile phone. It is noted that a set of base stations, its associated electronics, circuitry or components, base stations control component(s), and wireless links operated in accordance to respective base stations in the set of base stations form a radio access network (RAN). In addition, base station 910 communicates via backhaul link(s) 951 with a macro network platform 960, which in cellular wireless technologies (e.g., 3rd Generation Partnership Project (3GPP) Universal Mobile Telecommunication System (UMTS), Global System for Mobile Communication (GSM)) represents a core network.

In an aspect, macro network platform 960 controls a set of base stations 910 that serve either respective cells or a number of sectors within such cells. Base station 910 comprises radio equipment 914 for operation in one or more radio technologies, and a set of antennas 912 (e.g., smart antennas, microwave antennas, satellite dish(es) . . . ) that can serve one or more sectors within a macro cell 905. It is noted that a set of radio network control node(s), which can be a part of macro network platform 960; a set of base stations (e.g., Node B 910) that serve a set of macro cells 905; electronics, circuitry or components associated with the base stations in the set of base stations; a set of respective OTA wireless links (e.g., links 915 or 916) operated in accordance to a radio technology through the base stations; and backhaul link(s) 955 and 951 form a macro radio access network (RAN). Macro network platform 960 also communicates with other base stations (not shown) that serve other cells (not shown). Backhaul link(s) 951 or 953 can comprise a wired backbone link (e.g., optical fiber backbone, twisted-pair line, T1/E1 phone line, a digital subscriber line (DSL) either synchronous or asynchronous, an asymmetric ADSL, or a coaxial cable . . . ) or a wireless (e.g., line-of-sight (LOS) or non-LOS) backbone link. Backhaul pipe(s) 955 link disparate base stations 910. According to an aspect, backhaul link 953 can connect multiple femto access points 930 and/or controller components (CC) 901 to the femto network platform 902. In one example, multiple femto APs can be connected to a routing platform (RP) 987, which in turn can be connect to a controller component (CC) 901. Typically, the information from UEs 920$_A$ can be routed by the RP 987, for example, internally, to another UE 920$_A$ connected to a disparate femto AP connected to the RP 987, or, externally, to the femto network platform 902 via the CC 901, as discussed in detail supra.

In wireless environment 905, within one or more macro cell(s) 905, a set of femtocells 945 served by respective femto access points (APs) 930 can be deployed. It can be appreciated that, aspects of the subject innovation can be geared to femtocell deployments with substantive femto AP density, e.g., $9^4$-$10^7$ femto APs 930 per base station 910. According to an aspect, a set of femto access points 930$_1$-930$_N$, with N a natural number, can be functionally connected to a routing platform 987, which can be functionally coupled to a controller component 901. The controller component 901 can be operationally linked to the femto network platform 902 by employing backhaul link(s) 953. Accordingly, UE 920$_A$ connected to femto APs 930$_1$-930$_N$ can communicate internally within the femto enterprise via the routing platform (RP) 987 and/or can also communicate with the femto network platform 902 via the RP 987, controller component 901 and the backhaul link(s) 953. It can be appreciated that although only one femto enterprise is depicted in FIG. 9, multiple femto enterprise networks can be deployed within a macro cell 905.

It is noted that while various aspects, features, or advantages described herein have been illustrated through femto access point(s) and associated femto coverage, such aspects and features also can be exploited for home access point(s) (HAPs) that provide wireless coverage through substantially any, or any, disparate telecommunication technologies, such as for example Wi-Fi (wireless fidelity) or picocell telecommunication. Additionally, aspects, features, or advantages of the subject innovation can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Moreover, substantially all aspects of the subject innovation can comprise legacy telecommunication technologies.

With respect to FIG. 9, in example embodiment 900, base station AP 910 can receive and transmit signal(s) (e.g., traffic and control signals) from and to wireless devices, access terminals, wireless ports and routers, etc., through a set of antennas 912$_1$-912$_N$. It should be appreciated that while antennas 912$_1$-912$_N$ are a part of communication platform 925, which comprises electronic components and associated circuitry that provides for processing and manipulating of received signal(s) (e.g., a packet flow) and signal(s) (e.g., a broadcast control channel) to be transmitted. In an aspect, communication platform 925 comprises a transmitter/receiver (e.g., a transceiver) 966 that can convert signal(s) from analog format to digital format upon reception, and from digital format to analog format upon transmission. In addition, receiver/transmitter 966 can divide a single data stream into multiple, parallel data streams, or perform the reciprocal operation. Coupled to transceiver 966 is a multiplexer/demultiplexer 967 that facilitates manipulation of signal in time and frequency space. Electronic component 967 can multiplex information (data/traffic and control/signaling) according to various multiplexing schemes such as time division multiplexing (TDM), frequency division multiplexing (PDM), orthogonal frequency division multiplexing (OFDM), code division multiplexing (CDM), space division multiplexing (SDM). In addition, mux/demux component 967 can scramble and spread information (e.g., codes) according to substantially any code known in the art; e.g., Hadamard-Walsh codes, Baker codes, Kasami codes, polyphase codes, and so on. A modulator/demodulator 968 is also a part of operational group 925, and can modulate information according to multiple modulation techniques, such as frequency modulation, amplitude modulation (e.g., M-ary quadrature amplitude modulation (QAM), with M a positive integer), phase-shift keying (PSK), and the like.

Figure 10:
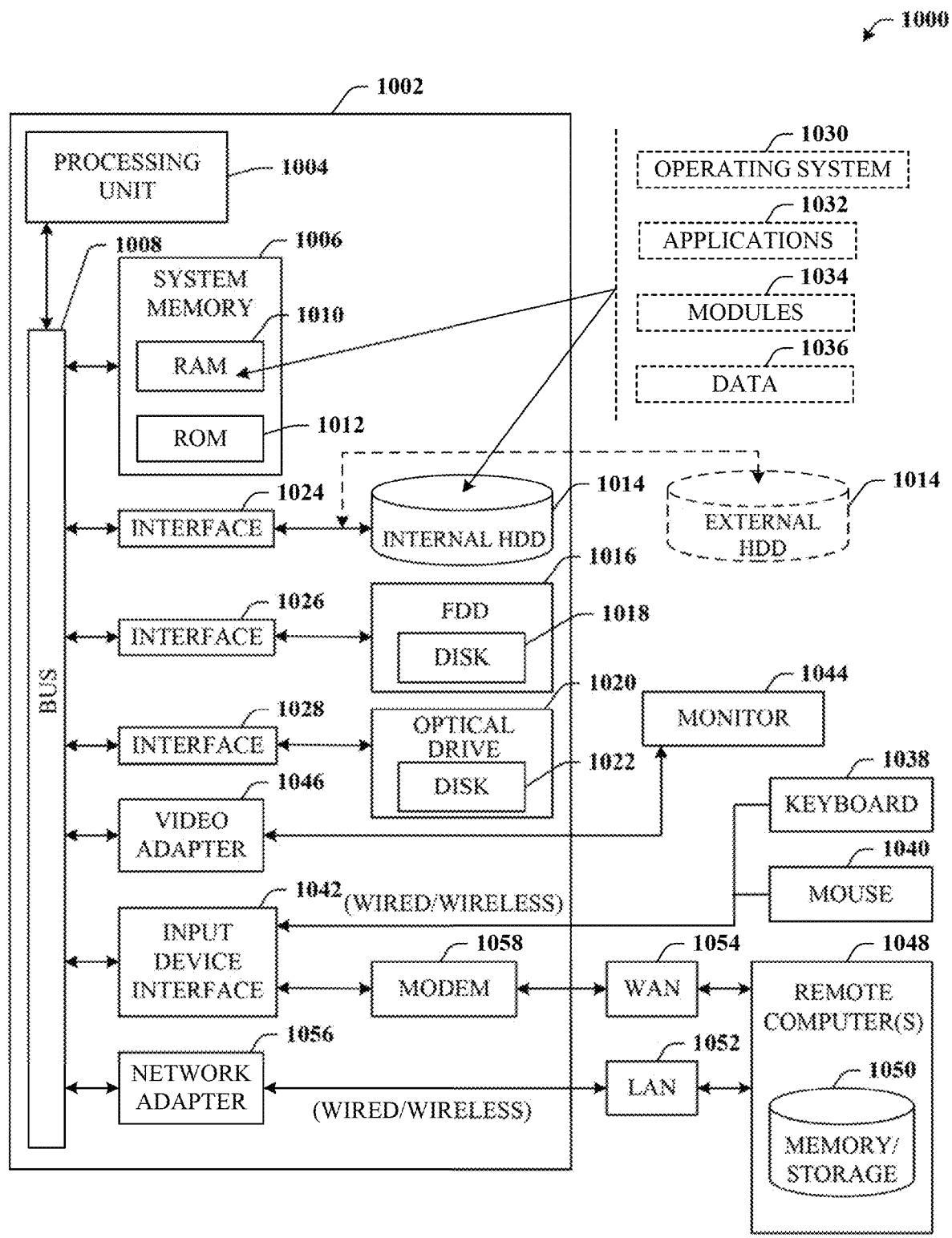
FIG. 10 illustrates an example block diagram of a computer operable to execute certain embodiments of this disclosure.

Referring now to FIG. 10, there is illustrated a block diagram of an exemplary computer system operable to execute the disclosed architecture. In order to provide additional context for various aspects of the disclosed subject matter, FIG. 10 and the following discussion are intended to provide a brief, general description of a suitable computing environment 1000 in which the various aspects of the disclosed subject matter can be implemented. Additionally, while the disclosed subject matter described above may be suitable for application in the general context of computer-executable instructions that may run on one or more computers, those skilled in the art will recognize that the disclosed subject matter also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the disclosed subject matter may also be practiced in distributed computing environments where certain tasks are performed by remote processing devices that are linked through a communications network. In a distributed computing environment, program modules can be located in both local and remote memory storage devices.

A computer typically comprises a variety of computer-readable media. Computer-readable media can be any available media that can be accessed by the computer and comprises both volatile and nonvolatile media, removable and non-removable media. By way of example, and not limitation, computer-readable media can comprise computer storage media and communication media. Computer storage media can comprise either volatile or nonvolatile, removable and non-removable media implemented in any method or technology for storage of information such as computer-readable instructions, data structures, program modules or other data. Computer storage media comprises, but is not limited to, RAM, ROM, EEPROM, flash memory or other memory technology, CD-ROM, digital versatile disk (DVD)

or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and comprises any information delivery media. The term "modulated data signal" means a signal that has one or more of its characteristics set or changed in such a manner as to encode information in the signal. By way of example, and not limitation, communication media comprises wired media such as a wired network or direct-wired connection, and wireless media such as acoustic, RF, infrared and other wireless media. Combinations of the any of the above should also be included within the scope of computer-readable media.

Still referring to FIG. 10, the exemplary environment 1000 for implementing various aspects of the disclosed subject matter comprises a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 comprises read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also comprise a high-speed RAM such as static RAM for caching data.

The computer 1002 further comprises an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations comprises at least one or both of Universal Serial Bus (USB) and IEEE1394 interface technologies. Other external drive connection technologies are within contemplation of the subject matter disclosed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the disclosed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the disclosed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may comprise a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically comprises other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically comprises many or all of the elements described relative to the computer 1002, although, for purposes of brevity, only a memory/storage device 1050 is illustrated. The logical connections depicted comprise wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also comprise a wireless access point disposed thereon for communicating with the wireless adapter 1056.

When used in a WAN networking environment, the computer 1002 can comprise a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This comprises at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

What has been described above comprises examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

As used in this application, the terms "system," "component," "interface," and the like are generally intended to refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. These components also can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry that is operated by software or firmware application(s) executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. An interface can comprise input/output (I/O) components as well as associated processor, application, and/or API components.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from by a computing device.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments comprises a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media.

Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

What is claimed is:

1. An access point device, comprising:
a first group of transceivers configured to collectively provide first coverage around the access point device, wherein the first coverage is substantially 360 degree coverage;
a second group of transceivers, interleaved between the first group of transceivers, configured to collectively provide second coverage around the access point device, wherein the second coverage is substantially 360 degree coverage;
a processor; and
a memory that stores executable instructions that, when executed by the processor, facilitate performance of operations, comprising:
determining that the first group of transceivers are to communicate according to a first frequency band to provide the first coverage; and determining that the second group of transceivers are to communicate according to a second frequency band, different than the first frequency band, to provide the second coverage.

2. The access point device of claim 1, wherein the first group of transceivers comprises three transceivers that communicate according to the first frequency band.

3. The access point device of claim 2, wherein the three transceivers that communicate according to the first frequency band are configured with respective main beam widths of approximately 65 degrees.

4. The access point device of claim 1, wherein the second group of transceivers comprises three transceivers that communicate according to the second frequency band.

5. The access point device of claim 4, wherein the three transceivers that communicate according to the second frequency band are configured with respective main beam widths of approximately 45 degrees.

6. The access point device of claim 1, wherein a main beam of a transceiver of the second group is configured to overlap a null region resulting from interference, at a sector boundary region, between signals transmitted by two transceivers of the first group.

7. The access point device of claim 1, wherein the operations further comprise determining a first group of frequency bands, comprising the first frequency band, with which the first group of transceivers is to communicate to provide the first coverage.

8. The access point device of claim 7, wherein the operations further comprise determining a second group of frequency bands, comprising the second frequency band, with which the second group of transceivers is to communicate to provide the second coverage, and wherein no member of the first group of frequency bands is included in the second group of frequency bands.

9. The access point device of claim 8, wherein the operations further comprise determining an updated membership of the first group of frequency bands and instructing the first group of transceivers to communicate according to the updated membership.

10. A method, comprising:
  determining, by a device comprising a processor, a first spectrum group comprising a first portion of frequency bands utilized by an access point device;
  determining, by the device, a second spectrum group comprising a second portion of the frequency bands utilized by the access point device, wherein the first spectrum group and the second spectrum group share no common frequency band of the frequency bands utilized by the access point device;
  instructing, by the device, a first transceiver group to communicate according to the first spectrum group, wherein the first transceiver group comprises first members that collectively support a first 360 degree service around the access point device; and
  instructing, by the device, a second transceiver group to communicate according to the second spectrum group, wherein the second transceiver group comprises second members that collectively support a second 360 degree service around the access point device.

11. The method of claim 10, further comprising determining, by the device, an update to membership of the first spectrum group.

12. The method of claim 11, wherein the determining the update is based on a forecasted utilization determined in response to a load metric of the access point device.

13. The method of claim 11, wherein the determining the update comprises removing a first member from the first spectrum group and adding the first member to the second spectrum group.

14. The method of claim 11, wherein the determining the update comprises adding a member to the first spectrum group in response to a spectrum update that increases the frequency bands utilized by the access point device.

15. A machine-readable storage medium, comprising executable instructions that, when executed by a processor, facilitate performance of operations, comprising, comprising:
  determining a first spectrum group and a second spectrum group, wherein the first spectrum group comprises a first portion of frequencies utilized by an access point device and the second spectrum group comprises a second portion of the frequencies, and wherein the first portion is exclusive of the second portion;
  instructing a first group of transceivers to communicate according to a first frequency of the first spectrum group, wherein the first group of transceivers comprises first members that, in aggregate, substantially support a first 360 degree coverage around the access point device; and
  instructing a second group of transceivers to communicate according to a second frequency of the second spectrum group, wherein the second group of transceivers comprises second members that, in aggregate, substantially support a second 360 degree coverage around the access point device.

16. The machine-readable storage medium of claim 15, wherein the first group of transceivers comprises three first transceivers that communicate according to the first frequency.

17. The machine-readable storage medium of claim 16, wherein the second group of transceivers comprises three second transceivers that communicate according to the second frequency.

18. The machine-readable storage medium of claim 16, wherein an azimuth of a transceiver of the second group of transceivers is configured to correspond to a null region that is determined to arise due to interference between signals of the first frequency propagated by two transceivers of the three first transceivers.

19. The machine-readable storage medium of claim 18, wherein the azimuth of the transceiver is approximately midway between respective azimuths of the two transceivers.

20. The machine-readable storage medium of claim 18, wherein the azimuth of the transceiver differs from respective azimuths of the two transceivers by about 60 degrees.

* * * * *